Nov. 5, 1935.  W. W. SPANINGER ET AL  2,020,006
ARTICLE OF MANUFACTURE
Filed Jan. 29, 1934
FIG-1-
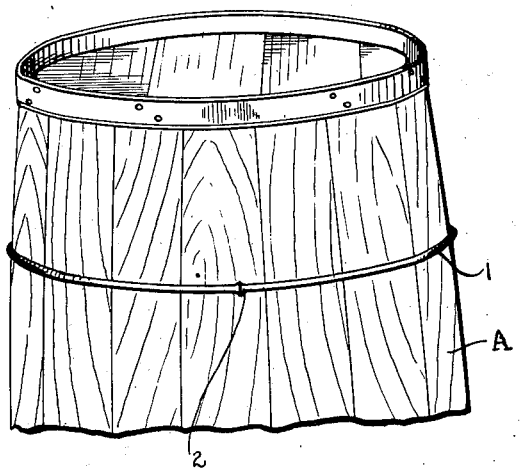
FIG-2-
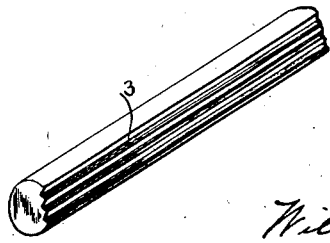
FIG-3-
INVENTORS
William W. Spaninger
Emil P. Kastner
BY
Chas. W. Laborde
ATT'Y Patented Nov. 5, 1935

2,020,006

UNITED STATES PATENT OFFICE 2,020,006

ARTICLE OF MANUFACTURE

William W. Spaninger and Emil P. Kastien, Peoria, Ill., assignors to Keystone Steel & Wire Company, Peoria, Ill., a corporation of Illinois Application January 29, 1934, Serial No. 708,738

4 Claims. (Cl. 217—91)

This invention has reference to an article of manufacture, to-wit, a wire hoop for kegs, barrels and similar or analogous containers and to the characteristics of the wire from which the hoop is formed.

The invention has for its primary object a wire hoop produced from a wire which has been heat-treated, preferably coated with a metallic coating and the ends of the wire welded to produce the completed hoop.

We are aware that it is not broadly new to provide hoops for pails, kegs, barrels, etc. where the ends of the hoops have been welded and the completed hoop then slipped into place on the article; also that it is not broadly new to weld the ends of such a hoop after it is on the article. These features are disclosed in the patent to Thomson No. 455,421 dated July 7, 1891. Furthermore, we are aware that wire hoops, for the purposes heretofore referred to, which have their ends connected by a twisted splice, are not new, a type of such twisted splice hoop being disclosed in the patent to Bates No. 746,442 dated Dec. 8, 1903. However, these several types of hoops, to which we have referred, are objectionable, as we shall point out, which objections are fully and practically overcome in the hoop which we have produced.

In the first place, such a hoop, as Thomson, Patent No. 455,421, refers to, where the ends of the hoop are welded and the hoop subsequently fitted over the pail, keg, barrel, etc. will not meet service requirements because the wire will not stretch without breaking, as it is forced onto the keg and more especially if there is any bilge, at all, in the article. The break invariably occurs just outside the area of the weld, where the grain structure of the steel has been enlarged through the heat radiated from the welding operation, which leaves the wire in a weakened condition at this point. Evidently Thomson realized this, due to his providing an annular groove in the article at the point of application of the hoop and welding the hoop after it was placed in the groove. Thomson had, no doubt, also realized the fact, and it is a fact, that welded wire hoops have not been successfully accomplished, by employing the ordinary black low carbon, low manganese content steel wire. A steel wire with such a chemical analysis when welded into hoop like form, will not permit the elongation necessary for the practical application of such hoops to the article, without breaking, as herein pointed out. We overcome this objection by employing a steel having a higher carbon and manganese content and then heat-treating it. The higher carbon and manganese content produces that tensile strength and ductility in the heat-treated steel wire which will permit the necessary stretching of the welded hoop, when applied to an article, without breaking. The heat-treatment produces wire which is of uniform tensile strength throughout, so that after welding the wire adjacent the weld will not be weaker than the balance of the wire due to the welding operation. Wire with these physical characteristics can be metallic coated and then welded, and such welded hoops applied to the article. Such a welded hoop can be used, with the same advantages, and without danger of breaking, on finished and unfinished articles; as for example, on nail kegs with rough staves and more or less bilge and on the more or less finished articles like butter tubs, candy pails and analogous containers.

Twisted splice hoops of the Bates type are subjected to the same objections, as those stated in reference to the welded hoops using the same black low carbon low manganese content steel. These twisted splice hoops have been and are a constant annoyance, because of breakage. They not only break in two, but at times in several places when strain is applied in forcing the hoops into place on the article. Furthermore, both the Thomson and Bates type hoops, when made from black wire will rust, thus leaving marks on the article when applied, and when applied to the more finished articles, as for example butter tubs, candy pails and like containers, such smudging makes the sale of hoops of this type difficult.

In carrying out the invention, while we prefer to use a round wire from which to produce the hoop, it is to be understood that we comprehend that wire of other cross-sectional shape may be used. Furthermore, that the impinging surface of the hoop which bears against the article shall have a surface deformation which will grip against the staves or exterior surface of the article, to prevent displacement when the hoop is in place.

A welded hoop having the characteristics we describe has distinct advantages over the twisted splice type in that the latter, when formed, do not retain a concentric form whereby to facilitate the easy slippage of the hoop over the article, but almost invariably have a flat side, where the twisted splice is made, which makes it difficult and sometimes requires a tool to assist in placing the hoop onto the article preparatory to its being forced into securing position.

That the invention may be more fully understood, reference is had to the accompanying drawing forming part of this description, illustrating a preferred form of the invention, in which:—

Fig. 1 shows a section of wire, broken in two, which has been heat-treated and a metallic coating applied;

Fig. 2 is a perspective view of a partial keg or container with the heat-treated, metallic coated and welded hoop applied thereto, and Fig. 3 is a perspective view of a section of the wire from which the hoop is formed, showing a surface deformation to enable the hoop to have a gripping engagement with the surface of an article when the hoop is applied thereto.

Like characters of reference denote corresponding parts throughout the figures.

In the drawing, a keg made of staves is designated A. This key may be of that type shown, or any type of keg, barrel, tub, pail, containers of analogous article. The hoop of our invention is designated 1, the ends of which have been welded, as at 2, to produce the complete hoop. This hoop when complete is applied in securing position on the article by a method now well known to those familiar with this practice. The hoop 1 is formed and welded from steel wire which has been heat-treated and then coated with a preferably metallic coating, as for example zinc spelter. We prefer that the face of the hoop which engages or bears against the surface of the article A shall be deformed, as at 3, to provide a substantial gripping surface, so that when the hoop has been applied to an article, the hoop will not slip thereon or become displaced, through handling of the article. This deformation may comprise the longitudinal ribs or serrations shown, which when produced may result in providing the wire with an approximately flat face on which the ribs or serrations appear, or the surface engaging portion of the wire may be knurled or roughened in any suitable or desirable form.

For our purpose, the wire of the hoop is of such chemical analysis, microstructure and physical properties that the ends of the formed hoop can be welded so as to insure against breakage of the hoop when the hoop is applied into securing position on an article. The chemical constitution and the heat-treatment of the seel wire may be varied depending on the combination of tensile strength, ductility and gauge of wire required for different uses. In practice we have found that when employing a #11 gauge wire for nail keg hoops, very definite and beneficial results are obtained with a carbon content of .14% and with a manganese content of .50%. When properly heat-treated, a wire made from such a steel has the following physical properties:—

|  | Breaking stress | Tensile | Elongation in 10″ |
|---|---|---|---|
|  | Pounds | Pounds per square inch | Percent |
| Average | 922 | 81,020 | 15.6 |
| Maximum | 1,005 | 88,364 | 18.0 |
| Minimum | 850 | 75,000 | 8.0 |

The foregoing record of physical properties was taken from 45 samples, average size of wire .120″. The wire was heat-treated by process annealing through molten lead at 1150° to 1250° F. The coating, zinc spelter was applied at approximately 900° F., producing a bright galvanized finish. The elongation obtainable makes possible the production of a welded hoop capable of withstanding the strains to be met when applying the hoop to an article.

Comparative tests, which we have made, indicate to us that even though a wire may have a tensile strength approximating that specified in the foregoing examples, comparable results could not be obtained in the resulting hoop due to the omission of proper heat-treatment. The difference in the elongation is the principal and controlling reason. For example—a #11 gauge wire, of .03% carbon content and .08% manganese content, not heat-treated (which is substantially the character of the average of the wire used in hoops) shows the following physical properties, as compared with those listed in the aforementioned example:

|  | Breaking stress | Tensile | Elongation in 10″ |
|---|---|---|---|
|  | Pounds | Pounds per square inch | Percent |
| Average | 976 | 85,201 | 2.36 |
| Maximum | 1,030 | 90,320 | 3.3 |
| Minimum | 880 | 77,167 | 1.7 |

Comparison of the two examples shows that, while the tensile strengths are practically the same, the elongation of the heat-treated wire is much greater than the elongation of the ordinary wire without heat-treatment. It should be noted here that, in order to obtain a tensile strength in the heat-treated wire equal to that in the untreated ordinary twisted hoop wire, it was necessary to use a higher content of carbon and manganese to offset the softening effect of the heat-treatment, which simultaneously produces the advantageous increase in ductility as measured in the per cent of elongation in 10″ of gauge length of the specimen tested in tension. It is this advantageous combination of tensile strength and ductility in the heat-treated and coated wire from which our hoops are formed and welded that makes possible the accommodation of said hoops to articles, regardless of the character or extent of the bilge, without breaking.

We realize that our hoops could be formed and welded from the same gauge and grade of steel wire as above and subsequently heat-treated to produce the desired tensile strength and elongation and then coated with any suitable protective material such as zinc, etc. However, we prefer to heat-treat the cold drawn wire by process annealing through molten lead prior to hot dip galvanizing, performing these operations in sequence and continuously as is commonly practiced in wire mills; and then to form and weld the finished hoops from such heat-treated and coated wire. This we believe to be the more economical procedure.

There is a demand for metallic coated hoops, which demand has not and could not be met with the types of hoops now manufactured—that is, the ordinary twisted black wire hoops and the common welded black wire hoops (lacking heat-treatment before or after welding) which are used on finished articles. Such hoops are usually subjected to weather conditions to produce a rust coat thereon so as to provide a gripping surface against the article. This is seriously objectionable for the more highly finished containers and also for the more or less rough containers due to discoloration and smudging of the surface of the container when the hoop is applied.

What we claim is:—

1. A hoop for tapered vessels, adapted to be driven thereon, possessing such ductility as to permit the hoop to stretch whereby to be given different permanent elongations by the driving act, and also of such tensile strength as to retain at each stretch the necessary tensile strength required by the vessel which it encompasses.

2. A hoop for tapered vessels, adapted to be driven thereon, formed of heat-treated metal and possessing such ductility as to permit the hoop to stretch whereby to be given different permanent elongations by the driving act, and also of such tensile strength as to retain at each stretch the necessary tensile strength required by the vessel which it encompasses.

3. A hoop for tapered vessels, adapted to be driven thereon, formed of heat-treated metal and possessing such ductility as to permit the hoop to stretch whereby to be given different permanent elongations by the driving act, and also of such tensile strength as to retain at each stretch the necessary tensile strength required by the vessel which it encompasses, the end portions of the hoop being welded together and substantially devoid of detrimental relative softening or weakening of the metal in the region of the weld to avoid breakage thereat.

4. A hoop for tapered vessels, adapted to be driven thereon, possessing such ductility as to permit the hoop to stretch whereby to be given different permanent elongations by the driving act, and also of such tensile strength as to retain at each stretch the necessary tensile strength required by the vessel which it encompasses, the impinging surface of the hook having a deformation adapted to grip against the exterior surface of the vessel.

WILLIAM W. SPANINGER.
EMIL P. KASTIEN.